March 9, 1954  H. W. BOTELER  2,671,470
TANDEM ACTING FLUID PRESSURE ACTUATOR
Filed March 30, 1951  4 Sheets-Sheet 1

*INVENTOR.*
Henry W. Boteler
BY
Harry Dexter Peck
ATTORNEY

March 9, 1954

H. W. BOTELER 2,671,470

TANDEM ACTING FLUID PRESSURE ACTUATOR

Filed March 30, 1951

INVENTOR.
Henry W. Boteler
BY
ATTORNEY

March 9, 1954 H. W. BOTELER 2,671,470
TANDEM ACTING FLUID PRESSURE ACTUATOR
Filed March 30, 1951 4 Sheets-Sheet 4

INVENTOR.
Henry W. Boteler
BY
Harry Dexter Peck
ATTORNEY

Patented Mar. 9, 1954

2,671,470

UNITED STATES PATENT OFFICE 2,671,470

TANDEM ACTING FLUID PRESSURE ACTUATOR

Henry W. Boteler, East Greenwich, R. I., assignor to Grinnell Corporation, Providence, R. I., a corporation of Delaware Application March 30, 1951, Serial No. 218,366

2 Claims. (Cl. 137—785)

This invention relates to improvements in tandem acting fluid pressure actuators. More especially it has to do with actuators of the type disclosed in the Fitch Patent No. 2,478,575 of August 9, 1949.

The actuator of the Fitch patent has many desirable characteristics. It has an over-all diametrical dimension only a little larger than the diameter of the area on which the fluid pressure is effective. It has no packing glands or stuffing boxes to prevent the leakage of pressure around its moving parts, hence it can be operated with a minimum of friction loss. It is compact, easy to assemble and disassemble, and is highly efficient. However, with a given fluid pressure the force which the actuator of the Fitch patent is capable of exerting is limited by the single effective area of the moving element on which the fluid pressure acts.

It is an object of the present invention to provide an actuator having the aforesaid desirable characteristics but with more than one effective area on which the fluid pressure acts, these areas being so arranged in tandem that for a given over-all diametrical dimension and a given fluid pressure the present invention is capable of exerting a much greater force than is obtainable from the actuator of the Fitch patent. These areas are provided in the improved actuator by having a movable cylinder unit cooperating with a fixed piston unit and a fixed cylinder unit cooperating with a movable piston unit to form separate pressure chambers, the fixed units being connected together and the movable units being also connected together by means which are outside of the pressure chambers. Except for a somewhat greater length the improved device disclosed herein retains the desired compactness and high ratio of effective area to diametrical size.

The best mode in which it has been contemplated applying the principles of my improvements is shown in the accompanying drawings, but these are primarily illustrative because it is intended that the patent shall cover by suitable expression in the appended claims whatever features of patentable novelty reside in the invention disclosed.

Figure 3:
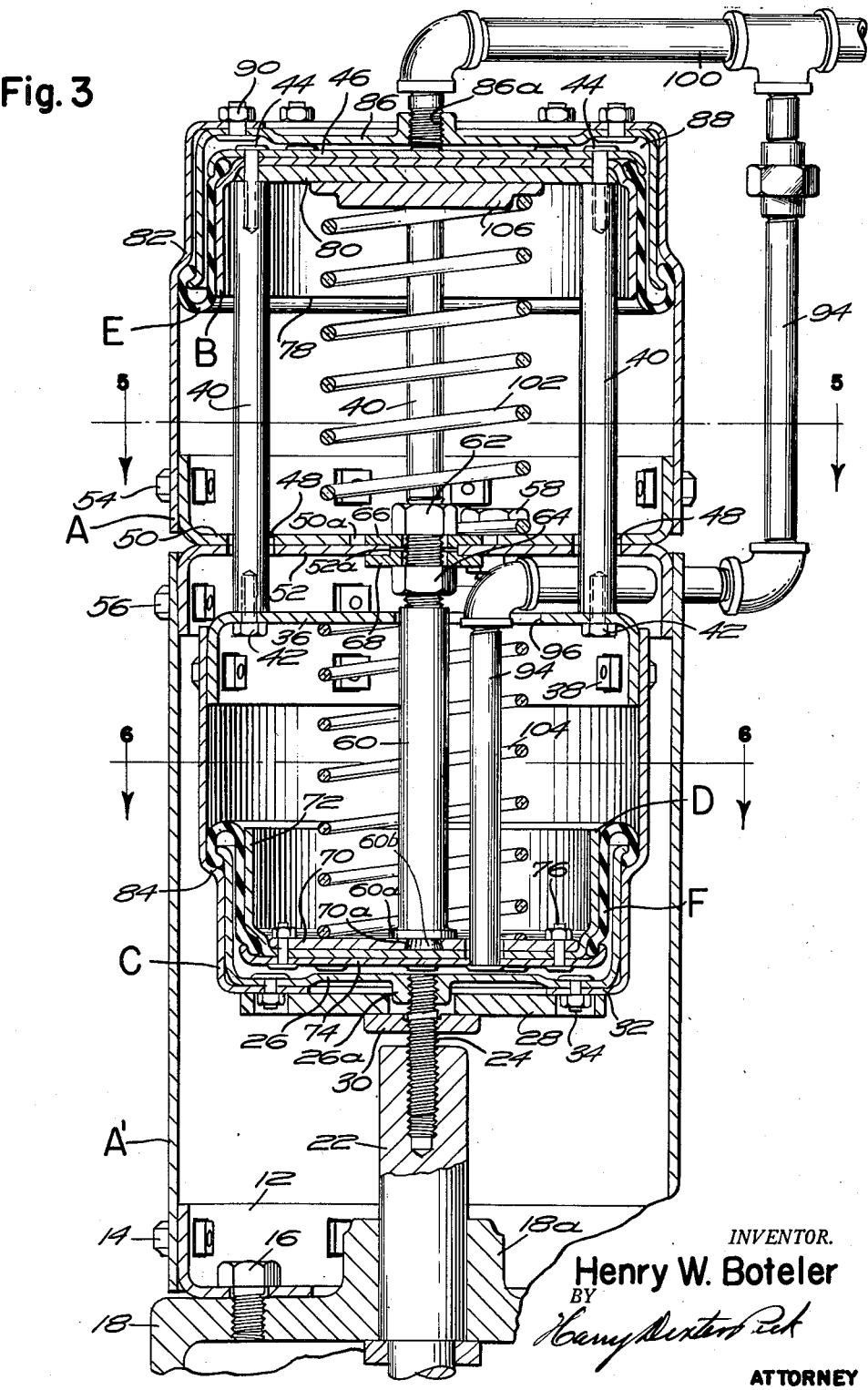
Fig. 3 is a cross-sectional view on larger scale, taken as on line 3—3 of Fig. 2, showing the positions of the actuator parts when no fluid pressure is being applied, with only a portion of the valve being shown.
Figure 5:
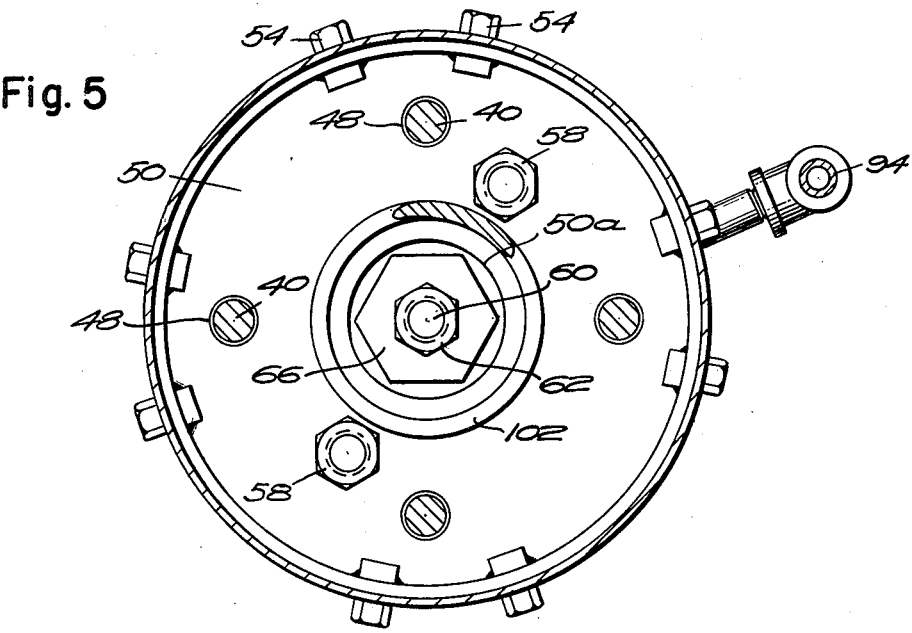
Figure 6:
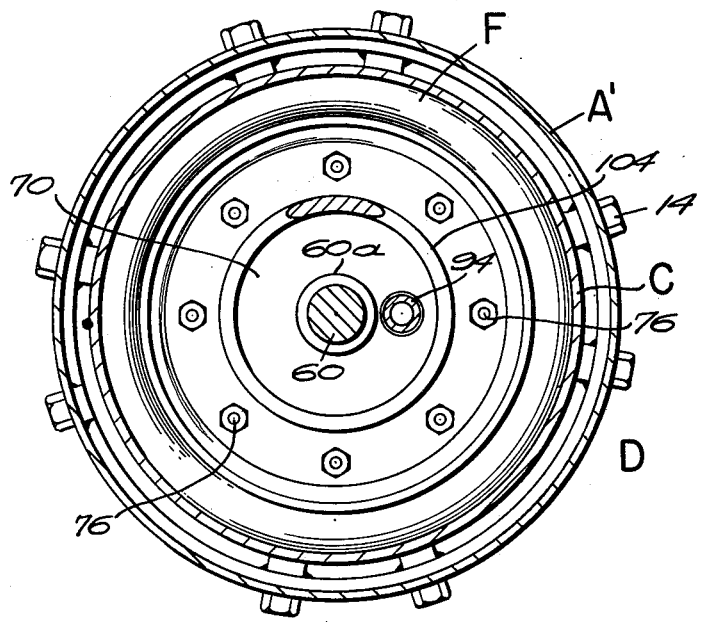

Figs. 5 and 6 are cross-sectional plan views taken as on lines 5—5 and 6—6 respectively of Fig. 3.

Referring now more particularly to the drawings, the improved actuator as a whole comprises a cylindrical casing made in two interconnected sections A and A'. The section A constitutes a fixed outer cylinder unit within which is a movable piston unit B. Section A' houses a movable cylinder unit C within which is a fixed piston unit D. Flexible sleeve diaphragms E and F combine with the cylinder units and their respective piston units to provide two pressure chambers in both of which fluid pressure is introduced to produce movement of the moving parts in one direction of travel.

In this description the words "outer" and "inner" refer to the relative positions of the parts with respect to the axis of the device, which is generally cylindrical in shape, and the words "upper" and "lower," "top" and "bottom," describe the relation of the parts to each other, assuming the device to be in the upright position shown in the drawings.

The section A' comprises a flanged bottom plate 12 suitably secured to the lower end of the cylindrical casing by bolts 14. As shown in the drawings, this bottom plate is also secured by cap screws 16 to the bonnet 18 of a diaphragm valve 20 such as is shown in Letters Patent No. 2,412,105 of December 3, 1946. This valve, however, is to be deemed primarily illustrative of any device having parts which it is desired to be moved by an actuator.

Figure 1:
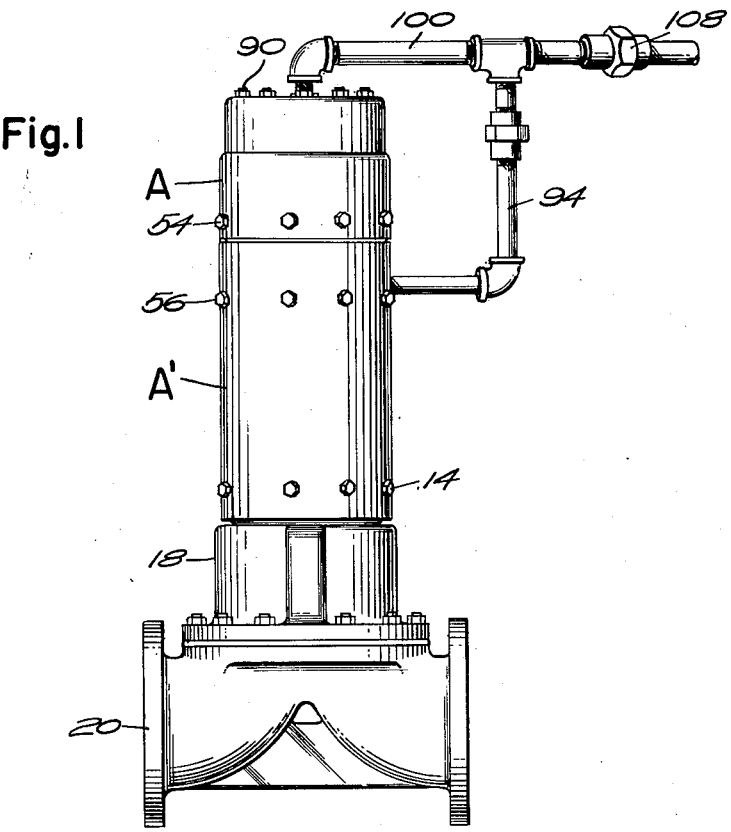
Fig. 1 is an elevation of an actuator embodying my improvements, and showing it applied to a diaphragm valve.
Figure 2:
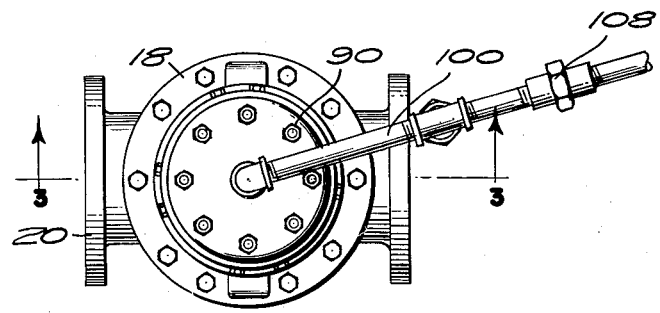
Fig. 2 is a plan view of the actuator and valve shown in Fig. 1.
Figure 4:
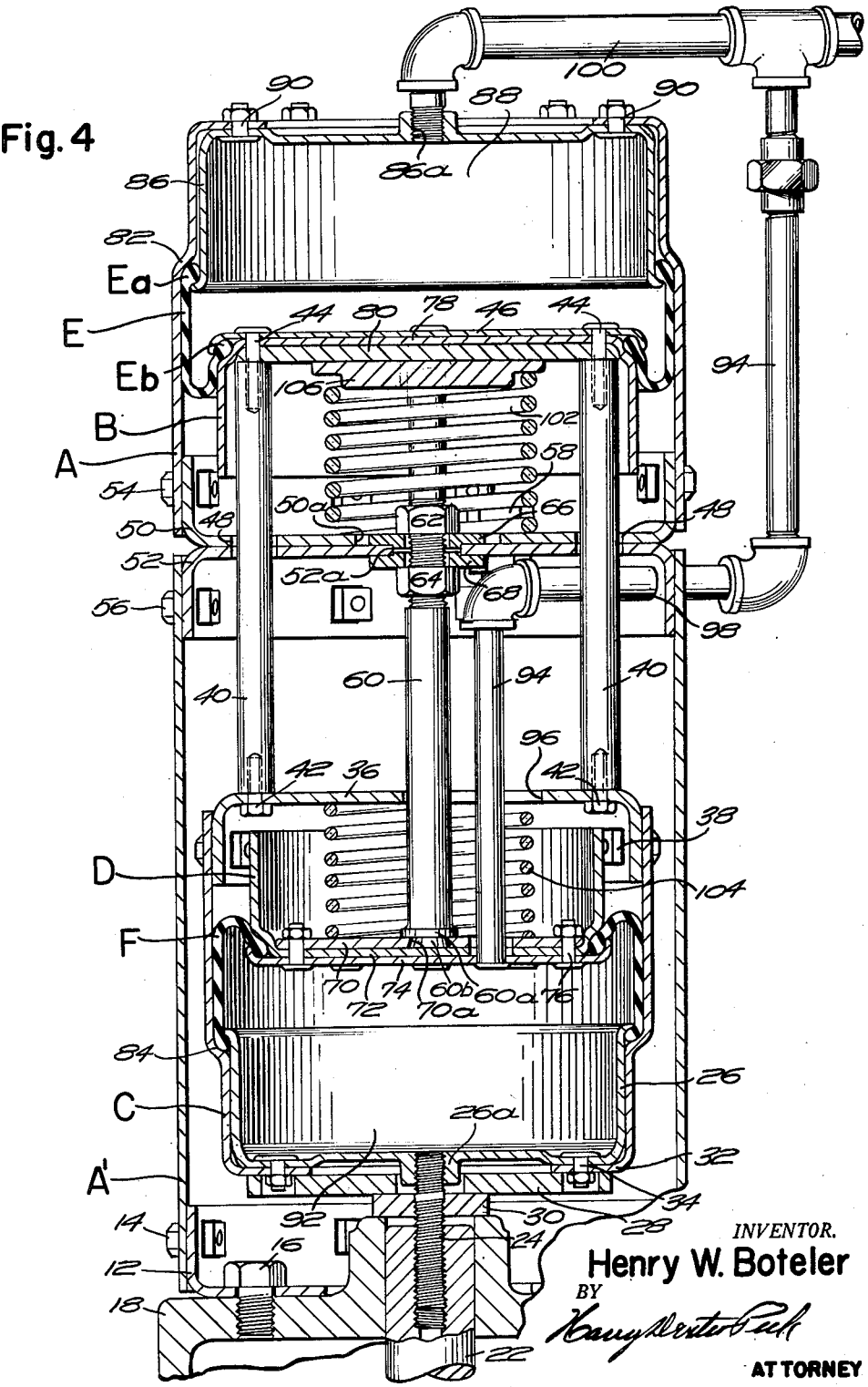
Fig. 4 is a view similar to Fig. 3 but showing the positions of the actuator parts when fluid pressure is applied.

Specifically the valve 20, shown in full in Figs. 1 and 2, is a "Grinnell-Saunders Diaphragm Valve." The portion of the valve, shown in Figs. 3 and 4, serves to illustrate the movement of a valve stem 22 which extends upward through the bonnet 18 of the valve casing and is attached to the moving parts of the actuator.

The upper end of the stem 22 is tapped along its axis to receive a threaded connecting rod 24 which not only screws into the valve stem 22 but also into a tapped hub 26a of a seal cup 26 in the movable cylinder unit C, thus forming a rigid connection between the valve stem 22 and the movable parts of the actuator.

A reinforcing plate 28 with a suitably located central hole to accommodate the hub 26a provides an annular seat for a locking-nut 30 which also screws onto the connecting rod 24 and when brought up tightly against the reinforcing plate prevents the connecting rod from turning relative thereto.

The inturned flange 32 at the lower end of the movable cylinder unit C is secured to the seal cup 26 by bolts 34, the relatively flat heads of which are welded to the seal cup to prevent leakage. A flanged plate 36 is secured to the upper end of the movable cylinder unit C by bolts 38.

This plate 36 is rigidly attached to the movable piston unit B in the upper section A of the actuator by rods 40 which are fastened to the said plate by cap screws 42 and are secured to the movable piston unit B by other screws 44, the heads of which are welded to the seal plate 46 of the movable piston unit B to avoid leakage. It is to be noted that these connecting means between the movable piston B and the movable cylinder C do not pass through the pressure chambers 88 and 92 and require no stuffing boxes, packing glands or other like sealing means to prevent leakage from the pressure chambers. The rods 40 extend through suitable holes 48 in flanged cross plates 50 and 52 which are secured by bolts 54 and 56 to the adjacent ends of the sections A and A' respectively of the actuator, and are fastened together by bolts 58 (see Fig. 5).

The two cross plates 50 and 52 are connected to the fixed piston unit D by a rod 60 having a threaded upper end which carries two clamping nuts 62 and 64. The rod passes through centrally located holes 50a and 52a of different sizes in cross plates 50 and 52 respectively. The hole 50a is the larger and accommodates a washer 66 which rests on the cross plate 52 and has an inner depending flange that extends downward into the smaller hole 52a. An upstanding inner flange on another washer 68 also extends into this smaller hole, with the major portion of the washer resting against the cross plate 52. Tightening these nuts 62 and 64 against the two washers clamps the rod 60 to the lower cross plate 52 which, as previously noted, is secured to the upper cross plate by the bolts 58.

The lower end of the rod 60 is secured to a reinforcing plate 70 of the fixed piston unit D. This is accomplished by providing the lower end of the rod with a flanged head 60a from which depends a short stem 60b which is inserted in a suitably tapered hole 70a centrally located in the said reinforcing plate 70. This stem is then peened over in the tapered hole thus securely riveting the rod 60 to the reinforcing plate 70. Again it is to be noted that the connecting means between the fixed cylinder A and the fixed piston D is outside the pressure chambers and hence requires no sealing means with respect to the movable elements. This reinforcing plate 70, a seal cup 72 and a seal plate 74, all parts of the fixed piston unit D, are secured together by bolts 76 the heads of which are welded to the seal plate to prevent leakage.

A similar arrangement is present in the movable piston unit B at the upper end of the actuator. There the bolts 44 and the rods 40 clamp the seal plate 46, a seal cup 78 and a reinforcing plate 80 tightly together.

Each seal cup 72 and 78 has a reversely curved portion between the skirt of the cup and its flat end plate, and each seal plate 74 and 46 has its outer edge rounded over. Each cylinder unit A and C has a reversely curved portion 82 and 84 respectively in the outer wall of the unit and each unit has an internal seal cup, 86 and 26 respectively. The ends of the skirts of these seal cups are curved outwardly opposite the said reversely curved portions 82 and 84. The purpose of these variously curved portions will be described in respect to the fixed upper cylinder unit A and the movable upper piston unit B and this will also serve as a description of the movable lower cylinder unit C and the fixed lower piston unit D.

Thus, considering the upper piston cylinder units A and B, a fluid pressure chamber 88 (see Fig. 4) is bounded by the seal cup 86 of the fixed cylinder unit A, the seal plate 46 of the movable piston unit B and the flexible sleeve diaphragm E. The latter is formed with a bead Ea along its outer edge and another bead Eb along its inner edge. The bead Ea is placed in the annular pocket provided by the cooperating reversely curved portions 82 of the outer casing and the curved outward edge of the seal cup 86. When the seal cup is drawn tightly into the outer casing by the bolts 90 the bead Ea is held securely in place and a tight seal is effected.

In a similar manner the bead Eb on the inner edge of the flexible sleeve diaphragm E is clamped securely and held in place between the cooperating contours of the suitably shaped portions of the seal plate 46 and the seal cup 78.

The arrangement of the piston-cylinder units D—C is identical to that of the piston cylinder units B—A with respect to the attachment of the sleeve diaphragm F. Here the seal plate 74, the diaphragm F and the seal cup 26 provide a pressure chamber 92.

Fluid pressure is admitted to and released from the two chambers 88 and 92 simultaneously. The fluid pressure enters chamber 92 through pipe 94 the lower end of which is passed through plates 70, 72 and 74 and seal welded to plate 74 around the outside of the pipe. A suitable slot-like hole 96 in the plate 36 accommodates the rod 60 and the pipe 94, a horizontal portion of which pipe 94 also extends through other suitable holes 98 in the flange of the cross plate 52 and in the outer cylinder casing A'. A second pipe 100 from the same source of supply brings the fluid pressure to chamber 88 at the hole 86a located in the seal cup 86 of the fixed cylinder A.

Springs 102 and 104 of sufficient combined strength to maintain the movable parts in the position shown in Fig. 3, when no fluid pressure is being applied, are located as shown in Figs. 3 and 4. Spring 104 is interposed between the reinforcing plate 70 of the fixed piston unit D and the end plate 36 of the movable cylinder unit C. Spring 102 is interposed between the fixed cross plate 50 and a spring retaining plate 106 which is preferably welded to the reinforcing plate 80 of the movable piston unit B.

The lower limit of the stroke of the moving parts is determined when the nut 30 engages the upper end of the hub 18a on the valve bonnet. If the diaphragm of the Saunders Valve does not seat tightly enough or too tightly when such engagement of the nut 30 and the hub 18a takes place, the bolts 14 can be removed, the pipes 94 and 100 disconnected from the pressure supply by opening a union 108, (see Fig. 1) and the entire actuator enclosed in a housing A and A' turned a whole turn one way or the other around its axis by turning said housings about their vertical axes. This screws the threaded connecting rod 24 either in or out of the valve stem 22 (which cannot be turned) and thus changes the relative position of the nut 30 to the seat of the diaphragm valve. The union 108 is then closed and the bolts 14 replaced and tightened.

The tandem arrangement of the effective areas on which the fluid pressure is applied enables a greater force to be exerted on the element to be actuated than could be exerted if only one of the effective areas were provided within the same diametrical dimension. This result is achieved by the novel arrangement of a movable piston unit connected in alignment with a movable cylinder unit. The operation of the device will be more fully understood from a description of the movements of the various parts from their positions as shown in Fig. 3 to their positions as shown in Fig. 4.

In Fig. 3 no fluid pressure is being introduced to the device through pipes 94 and 100, and consequently there is no pressure in chambers 88 and 92. Accordingly, the compression springs 102 and 104 cooperate to hold the interconnected movable members in their uppermost positions as shown. These movable members are the movable piston unit B, the movable cylinder unit C, the rods 40 rigidly connecting the movable units B and C and the component to be actuated which in this case is the valve stem 22 connected to the movable cylinder unit C. Spring 102 urges the interconnected movable members to their uppermost positions because it is confined between the cross plates 50 and 52 at its lower end and the movable piston unit B at its upper end. Spring 104 aids spring 102 because it is confined between the fixed piston unit D at its lower end and the movable cylinder unit C at its upper end.

When fluid pressure is introduced into chambers 88 and 92 it exerts downward force against the movable piston unit B bounding the lower side of chamber 88 and similarly exerts downward force against the movable cylinder unit C bounding the lower side of chamber 92. The sum of these downward forces substantially exceeds the sum of the opposing forces exerted by the springs 102 and 104 when fluid under suitable pressure is employed, and as a result the interconnected movable members are moved downwardly into the positions shown in Fig. 4. Free axial movement of the rods 40 through the cross plates 50 and 52 is permitted by the holes 48 in these cross plates. Free axial movement of the movable cylinder unit C with respect to the fixed rod 60 and the adjacent fixed fluid pressure pipe 94 is permitted by the hole 96 in the end of this movable unit C. This pipe 94 and the corresponding pipe 100 need not be flexible because they communicate with the chambers 92 and 88, respectively, through the fixed walls thereof.

The valve stem is secured to the movable cylinder unit C and is moved downwardly by the force resulting from fluid pressure in chamber 92 acting on the effective area of the unit C. In addition, however, the valve stem is also moved downwardly by the force resulting from fluid pressure in chamber 88 acting on the effective area of the movable piston unit B, because the units B and C are rigidly interconnected by the rods 40. Thus as a whole there is maintained a desirable compactness and high ratio of effective area to diametrical size.

Although the improved actuator is illustrated in its application to a diaphragm valve, it is to be understood that its use is not so limited. The outer casing A' can be secured to any fixed element and the movable parts connected by suitable means to whatever is desired to be moved by the actuator.

I claim:

1. A tandem-acting fluid pressure actuator comprising a fixed outer cylinder unit; a movable pressure actuated piston unit arranged within said fixed outer cylinder unit; a movable pressure actuated inner cylinder unit also arranged within said fixed outer cylinder unit; a fixed piston unit arranged within said movable inner cylinder unit and connected to said fixed outer cylinder unit; said movable units being connected together; means for transmitting the motion of the said movable units to an element to be actuated; a flexible sleeve diaphragm having one circular edge thereof secured to said fixed outer cylinder unit and having its other circular edge secured to said movable piston unit; a second flexible sleeve diaphragm having one circular edge thereof secured to said movable inner cylinder unit and having its other circular edge secured to said fixed piston unit; the said fixed outer cylinder unit, the said movable piston unit and the first said sleeve diaphragm defining one pressure chamber and the said movable inner cylinder unit, the said fixed piston unit and the second sleeve diaphragm defining a second pressure chamber; the means connecting said movable units together and the means connecting said fixed piston unit to said fixed outer cylinder unit being outside both said pressure chambers; means for simultaneously introducing the same pressure to both said pressure chambers to effect travel of the said movable units in one direction; spring means interposed between said fixed outer cylinder unit and said movable piston unit and other spring means interposed between said fixed piston unit and said movable inner cylinder unit, both said spring means being effective to cause travel of the said movable units in a direction opposite to that effected by the fluid pressure.

2. A tandem-acting fluid pressure actuator having a fixed outer cylinder unit; a movable piston unit therein; a flexible sleeve diaphragm interposed between said fixed outer cylinder unit and said movable piston unit defining therewith a fluid pressure chamber; a movable inner cylinder unit within said fixed outer cylinder unit; a fixed piston unit within said movable inner cylinder unit; a flexible sleeve diaphragm interposed between said movable inner cylinder unit and said fixed piston unit defining therewith a second fluid pressure chamber; means connecting said movable inner cylinder unit to said movable piston unit and additional means connecting said fixed piston unit to said fixed outer cylinder unit, both said connecting means being outside of both said fluid pressure chambers; an element to be actuated connected to the said movable units; means for introducing pressure into both said chambers simultaneously to effect movement of said element in one direction; and spring means interposed between said fixed units and said movable units to effect movement of the movable parts in a direction opposite to the direction of the movement caused by the said pressure.

HENRY W. BOTELER.

References Cited in the file of this patent

UNITED STATES PATENTS

| Number | Name | Date |
| --- | --- | --- |
| 786,409 | Coon | Apr. 4, 1905 |
| 1,289,795 | Johnson | Dec. 31, 1918 |
| 2,437,552 | Quiroz | Mar. 9, 1948 |
| 2,467,517 | Almond | Apr. 19, 1949 |
| 2,478,575 | Fitch | Aug. 9, 1949 |